W. ZSCHOKKE.
SPHERICALLY, CHROMATICALLY, ASTIGMATICALLY, AND COMATICALLY CORRECTED
DOUBLE OBJECTIVE.
APPLICATION FILED JAN. 17, 1913.
1,108,307.
Patented Aug. 25, 1914.
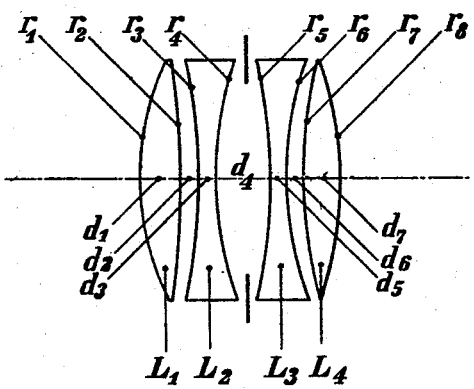

UNITED STATES PATENT OFFICE.

WALTHER ZSCHOKKE, OF STEGLITZ, GERMANY, ASSIGNOR TO THE FIRM OF OPTISCHE ANSTALT C. P. GOERZ AKTIENGESELLSCHAFT, OF BERLIN, GERMANY.

SPHERICALLY, CHROMATICALLY, ASTIGMATICALLY, AND COMATICALLY CORRECTED DOUBLE OBJECTIVE.

1,108,307.      Specification of Letters Patent.      Patented Aug. 25, 1914.

Application filed January 17, 1913. Serial No. 742,523.

*To all whom it may concern:*

Be it known that I, WALTHER ZSCHOKKE, engineer, a citizen of Switzerland, residing at 40 Sedanstrasse, Steglitz, near Berlin, Germany, have invented certain new and useful Improvements in and Relating to Spherically, Chromatically, Astigmatically, and Comatically Corrected Double Objectives, of which the following is a specification.

This invention relates to a spherically, chromatically, astigmatically and comatically corrected double objective, each member of which consists of a positive lens of highly refractive baryt-crown, and a negative lens of less refractive power, the two lenses being separated by an air space in the form of a positive meniscus.

The object of the invention is to improve the quality of the image produced by lenses of this kind, more particularly to reduce the coma error. This purpose is primarily attained by a special shaping of the negative lenses of the two objective members. This consists in making, in the two negative lenses, the border surfaces of different curvatures and arranging the lenses in relation to the diaphragm so that the more strongly curved surface of the negative lens in the front member, and the less strongly curved surface of the negative lens in the rear member, are directed toward the diaphragm. For obtaining the best results the front member of the objective should have a greater focal length than the rear member, but not exceeding twice the focal length of the latter. This disposition of focal lengths has the advantage that in normal use of the objective in a camera of the bellows type the length of the bellows is sufficient to enable each objective member to be used separately. Such separate use is possible, inasmuch as the two objective members, though not individually corrected, furnish useful pictures if considerably stopped down.

The following are the constants in one example of an objective constructed according to the invention and shown in the accompanying drawing where the reference letters $r$ belonging to the several surfaces designate the radii of curvature of said surfaces and the letters $d$ the thicknesses of the several lenses in axial section.

$r_1 = +\ 27.701$
$r_2 = -103.093$
$r_3 = -\ 53.909$
$r_4 = +\ 37.736$
$r_5 = -\ 63.291$
$r_6 = +\ 35.088$
$r_7 = +\ 53.191$
$r_8 = -\ 35.690$ $d_1 = 4.2$   $n_D = 1.61412$   $n_{G'} = 1.62803$   $C-F = 0.01090$
$d_2 = 1.8$
$d_3 = 1.6$   $n_D = 1.56890$   $n_{G'} = 1.58637$   $C-F = 0.01335$
$d_4 = 5.4$
$d_5 = 1.6$   $n_D = 1.54820$   $n_{G'} = 1.56364$   $C-F = 0.01188$
$d_6 = 1.8$
$d_7 = 3.6$   $n_D = 1.61412$   $n_{G'} = 1.62803$   $C-F = 0.01090$

Focal length = 100. Aperture ratio 1:4.5.

What I claim is:—

1. A spherically, chromatically, astigmatically and comatically corrected double objective the members of which comprising each a positive lens of highly refractive baryt-crown and a negative lens of less refractive power each of the two negative lenses separated by an air-space of the shape of a positive meniscus from the positive lens of its member and provided with two surfaces of different curvatures, the more strongly curved surface of the negative lens of the front member, and the less strongly curved surface of the negative lens of the rear member being directed toward each other.

2. A spherically, chromatically, astigmatically and comatically corrected double objective the members of which comprising each a positive lens of highly refractive baryt-crown and a negative lens of less refractive power each of the two negative lenses separated by an air-space of the shape of a positive meniscus from the positive lens of its member and provided with two surfaces of different curvatures, the more strongly curved surface of the negative lens of the front member and the less strongly curved surface of the negative lens of the rear member being directed toward each other, the two members having different focal lengths, the focal length of the front member being greater than that of the rear member, but not more than twice as great.

In testimony whereof I have signed this specification in the presence of two subscribing witnesses.

WALTHER ZSCHOKKE.

Witnesses:
HENRY HASPER,
WOLDEMAR HAUPT.

Copies of this patent may be obtained for five cents each, by addressing the "Commissioner of Patents, Washington, D. C."